United States Patent [19]

Hinz et al.

[11] Patent Number: 5,254,455

[45] Date of Patent: Oct. 19, 1993

[54] SILVER HALIDE EMULSIONS SPECTRALLY SENSITIZED TO INFRARED RADIATION WITH NOVEL CYANINE DYES

[75] Inventors: Zbigniew J. Hinz, Melrose; Emmett S. McCaskill, Wellesley, both of Mass.

[73] Assignee: Polaroid Corporation, Cambridge, Mass.

[21] Appl. No.: 801,441

[22] Filed: Dec. 2, 1991

[51] Int. Cl.$^5$ ................................ G03C 1/20
[52] U.S. Cl. .................... 430/584; 430/202; 430/210; 430/505; 430/581; 430/944; 548/156
[58] Field of Search .......... 430/584, 210, 202, 505, 430/944, 383, 581; 548/156

[56] References Cited

U.S. PATENT DOCUMENTS

| | | | |
|---|---|---|---|
| 3,647,436 | 3/1972 | Bush | 430/212 |
| 3,955,996 | 5/1976 | Hinata et al. | 96/129 |
| 4,046,572 | 9/1977 | Hinata et al. | |
| 4,076,529 | 2/1978 | Fleckenstein et al. | |
| 4,387,155 | 6/1983 | Hill et al. | 430/217 |
| 4,603,098 | 7/1986 | Franke et al. | 548/156 |

FOREIGN PATENT DOCUMENTS

| | | |
|---|---|---|
| 302528 | 8/1988 | European Pat. Off. |
| 313021 | 10/1988 | European Pat. Off. |
| 421452 | 10/1990 | European Pat. Off. |

OTHER PUBLICATIONS

Patent Abstracts of Japan, vol. 10, No. 89, 1986.
Kiprianov, A. I., Yagupolsky, L. M., J. Chem. USSR, 20, 2111; Eng. Trans. 2187 (1950).

Primary Examiner—Charles L. Bowers, Jr.
Assistant Examiner—Thorl Chen
Attorney, Agent, or Firm—Stanley H. Mervis

[57] ABSTRACT

This invention relates to photographic silver halide emulsions spectrally sensitized to infrared radiation above 800 nm and to a class of pentamethine cyanine dyes of 5-fluorobenzothiazole derivatives useful as the infrared sensitizing dyes.

24 Claims, No Drawings

SILVER HALIDE EMULSIONS SPECTRALLY SENSITIZED TO INFRARED RADIATION WITH NOVEL CYANINE DYES

BACKGROUND OF THE INVENTION

1. Field of the Invention

The present invention relates to photographic light-sensitive silver halide emulsions wherein the silver halide grains are spectrally sensitized to infrared radiation at wavelengths above 800 nm, to photographic elements and film units employing these emulsions and to a class of pentamethine cyanine dyes employed as the infrared sensitizing dyes.

2. Background Art

It is well known in the photographic art that the photosensitive response of silver halide emulsions can be extended to longer wavelengths by the addition of spectral sensitizing dyes, notably cyanine dyes. This technique has been employed to sensitize silver halide emulsions to a specific wavelength region in the visible and also the infrared portion of the electromagnetic spectrum and has been widely used in the production of photosensitive elements for color photography which comprise a plurality of spectrally sensitized emulsion layers that respond to different wavelength regions of the spectrum. This technique also has been employed in the production of panchromatically sensitized emulsions, generally by employing a combination of sensitizing dyes to provide the requisite sensitivity over the wavelength range of about 400 nm to 650 nm.

Various cyanine dyes have been used as spectral sensitizing dyes including polymethine dyes possessing a fluoro-substituted benzothiazole nucleus. For example, Kiprianov and Yagupolsky in J. Chem. USSR, 20, 211: Eng. Trans. 2187 (1950) disclose symmetrical and unsymmetrical cationic cyanine dyes obtained from derivatives of 6-fluorobenzothiazole. U.S. Pat. No. 4,387,155 is directed to certain unsymmetrical cyanine dyes useful as green sensitizing dyes which possess a benzoxazole nucleus and a 5-fluorobenzothiazole nucleus. U.S. Pat. No. 3,955,996 discloses a method for spectrally sensitizing a photographic light-sensitive emulsion employing a spectral sensitizing dye having an amidinium ion auxochrome and in columns 3 and 4 disclose numerous cyanine dyes including symmetrical and unsymmetrical polymethine dyes of fluoro-substituted benzothiazoles.

SUMMARY OF THE INVENTION

The present invention is concerned with photographic light-sensitive materials, particularly photographic light-sensitive silver halide emulsions spectrally sensitized to infrared radiation above 800 nm employing a novel class of pentamethine cyanine dyes of 5-fluorobenzothiazole derivatives.

These dyes can be readily incorporated into a wide variety of photographic silver halide emulsion systems for use in both black-and-white and color imaging. The resulting emulsions, besides possessing high sensitivity in the infrared, exhibit good stability against fogging before, during and after coating. Indeed, the coated photosensitive emulsions exhibit excellent speed in the infrared region of the spectrum as well as good sensitivity in the blue region of inherent sensitivity and retain these sensitivities on prolonged storage at room temperature.

It is, therefore, among the objects of the present invention to provide light-sensitive materials spectrally sensitized to radiation in the infrared region of the electromagnetic spectrum, to photographic elements and film units comprising the infrared sensitized materials and to provide a novel specific class of infrared sensitizing dyes for spectrally sensitizing the light-sensitive materials.

DETAILED DESCRIPTION OF THE INVENTION

In particular, it has been found quite unexpectedly that certain pentamethine cyanine dyes are effective as infrared spectral sensitizing dyes, which dyes may be represented by the following formula (Formula I):

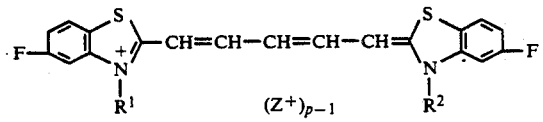

wherein $R^1$ is alkyl having 2 to 4 carbon atoms or —$(CH_2)_m R'$ wherein $R'$ is carboxy or sulfo and m is 2, 3 or 4; $R^2$ is —$(CH_2)_n R''$ wherein $R''$ is carboxy or sulfo and n is 2, 3 or 4; $Z^+$ is a counter ion; and p is 1 or 2 provided p is 1 when $R^1$ is alkyl and p is 2 when $R^1$ is —$(CH_2)_m R'$. In a preferred embodiment, $R'$ and $R''$ are sulfo, and in a particularly preferred embodiment, $R^1$ is —$(CH_2)_m R'$ wherein $R'$ is sulfo and —$(CH_2)_m R'$ and —$(CH_2)_n R''$ are the same. These dyes exhibit the ability to form a stable J-band aggregate.

In the above-denoted compounds, $Z^+$ is a water-soluble cation and may be any single atomic ion, such as sodium or postassium, or an ionic group having a positive charge, for example, ammonium, triethylammonium, triethanolammonium, pyridinium and the like and usually is triethylammonium.

The subject dyes can be synthesized in accordance with known procedures as described in the following syntheses and as described in F. M. Hamer, The Cyanine Dyes and Related Compounds, Interscience Publishers, New York (1964). As an illustration, the subject dyes and those set forth below as comparative dyes may be synthesized as follows:

1. Quaternary Salts from Heterocyclic Bases

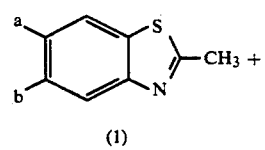

(1)

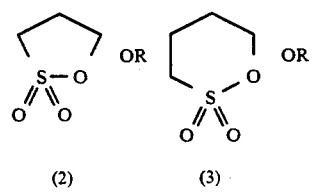

(2)        (3)

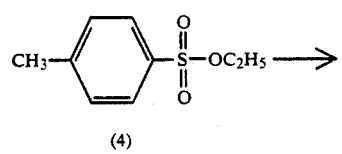

(4)

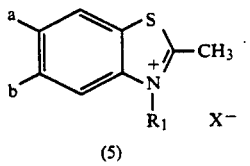

The appropriately substituted 2-methylbenzothiazole base (1) where a and b represent the substituents (H, F, Cl, or CF₃) may be reacted at about 120° C. with propane sultone (2), butane sultone (3), or ethyl-p-toluene sulfonate (4) in sulfolane to give the N-substituted 2-methylbenzothiazole quaternary salt (5) where R₁ is a sulfopropyl, sulfobutyl, or an ethyl group, respectively. In the case of sulfopropyl and sulfobutyl substituents, there is no counterion since the quaternary is zwitterionic. In the case where R₁ is ethyl, X- may be p-toluene sulfonate or other anion. The bases where a=b=H and a=H, b=Cl are commercially available. The bases where a=H and b=CF₃ or F may be prepared in a known manner from commercially available starting materials, namely, 4-chloro-3-nitrobenzotrifluoride or 2,5-difluoro-nitrobenzene, respectively, according to the method of Kiprianov and Yagupolsky, J. Gen. Chem. (USSR) Vol. 22, 2209–15 (1952). The base where a=F and b=H may be prepared by the method disclosed in the previously mentioned Kiprianov and Yagupolsky reference.

Condensation of Dicarbocyanine Dyes

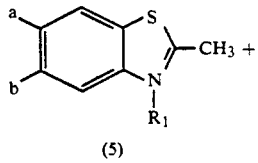

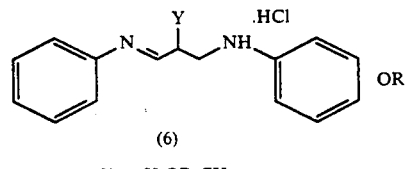

Y = H OR CH₃

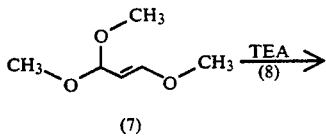

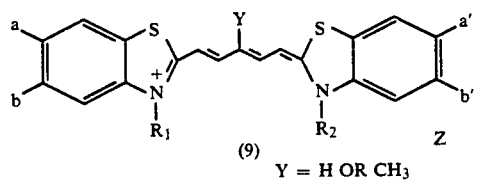

Y = H OR CH₃

The dyes (9) may be prepared by condensing appropriate quaternary salts (5) with either 1,3,3-trimethoxypropene (7) or a malonaldehyde anil hydrochloride (6) in the presence of triethylamine (8) In the case of symmetrical dicarbocyanine dyes, the reaction involves two equivalents of the same quaternary salt reacting with either (7) or (8) to give the corresponding pentamethine dye. Usually "Z" is the triethylammonium ion. However, in the case where R₁ and R₂ are alkyl, "Z" may be p-toluene sulfonate or other appropriate ion.

The dyes comprising carboxyalkyl groups may be prepared in a conventional manner by reacting the heterocyclic base with an appropriate bromo-ester followed by hydrolysis.

The following examples are given to further illustrate the synthesis of the compounds of the present invention and are not intended to limit the scope thereof. Unless otherwise indicated, all parts, percents, ratios and the like are by weight unless otherwise specified and "TEA" designates the triethylammonium ion.

EXAMPLE 1

Preparation of the compound having the formula

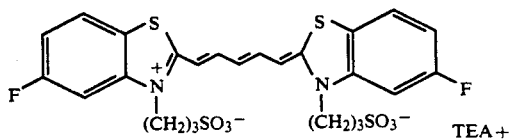

5,5'-Difluoro-3,3'-disulfopropylthiadicarbocyanine Triethylammonium Salt

Original Preparation 14.5 g (0.050M) of 5-fluoro-2methyl-3-(3'-sulfopropyl)-benzothiazolium betaine, 6.6g (0.050M) of 1,3,3-trimethoxypropene, and 7.0 ml (0.050M) of triethylamine were combined in 50 ml of acetonitrile/ethanol (9:1). A deep blue color formed immediately upon addition of the triethylamine. The reaction mixture was heated to 80° C. for 5 minutes, then allowed to cool to room temperature. The solid that crystallized out was collected, washed with acetonitrile, recrystallized from hot trifluoroethanol/methanol, and dried in a vacuum desiccator overnight at 90° C. The λmax=658 nm (20% trifluoroethanol/80% methanol); ε=297,000. Yield of dye was 8.9 g (25%). Mass spectroscopy by FAB+ gave the expected m/e=615 mass units. Analysis by HPLC on a reverse phase C-18 column using 70% methanol/water containing 0.002 molar tert-butylammonium phosphate as an ion pairing reagent, gave a purity of 97% (by area).

Remake

The betaine, 148.5 g (0.514 moles), was placed in a 1-liter round bottom flask and suspended with stirring in 250 ml of a solvent mixture consisting of 10% absolute ethanol and 90% acetonitrile. The mixture was heated in an oil bath to 80° C., and 34 g (0.257 moles) of 1,3,3-trimethoxypropene was added. After a few minutes of stirring, 36 ml (0.257 moles) of triethylamine were added, the solution instantly turning a deep magenta-blue color. Stirring and heating were continued for an additional 2 hours, during which time a gelatinous solid formed and fell out of solution. The dark suspension was allowed to cool to room temperature, and the solid blue dye was collected by vacuum filtration. The dye was washed with acetonitrile until the eluent was free of magenta color, then resuspended in 100 ml of 2-propanol and refluxed for 10 minutes. The suspension was allowed to cool to room temperature, the blue solid was collected by vacuum filtration and washed with 200 ml of cold ethanol. The dye was recrystallized from hot trifluoroethanol and dried in a heated (90° C.) vacuum desiccator for 16 hours. The yield of dye was 49.6 g (27%). The absorption maximum and epsilon were the same as found in the original preparation. The dye was analyzed by HPLC using a reverse phase C-18 column and an ion pairing reagent in the mobile phase; purity was 97%.

The 5-fluoro-2-methyl-3-(3'-sulfopropyl)-benzothiazolium betaine employed in the foregoing syntheses was prepared as follows:

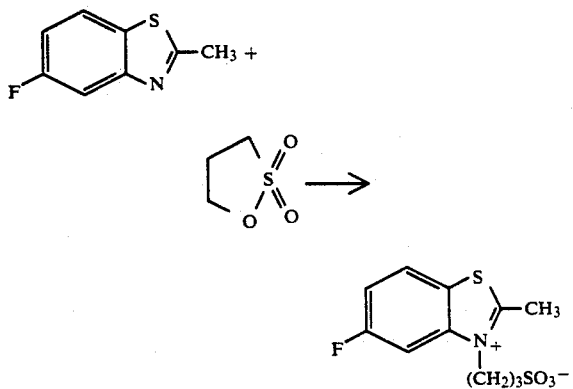

Into a 2-liter, 3-necked round bottom flask equipped with a mechanical stirrer were combined 200 g (1.2 moles) of 5-fluoro-2-methyl benzothiazole and 140g (1.2 moles) of propane sultone. The flask was then heated in an oil bath (125° C.), the contents melted and mixed under vigorous stirring. After a few minutes solid became visible. At this point 200 ml of sulfolane were introduced as the solid formed very quickly. After 1 hour a second 200 ml portion of sulfolane was added to the thick reaction mixture to aid in stirring. The reaction was allowed to heat and stir overnight.

The reaction mass was allowed to cool (stirring continued) to below 50° C. Approximately 1-liter of acetone was added, and the suspension was allowed to cool to room temperature. The solid was collected by vacuum filtration, washed with 2×200 ml portions of acetone, and dried in a vacuum desiccator overnight at 80° C. The yield of betaine was 225 g (65%). FAB+ gave a m/e=290 mass units. Proton and C-13 NMR were consistent with the proposed structure.

EXAMPLE 2

Preparation of the compound having the formula

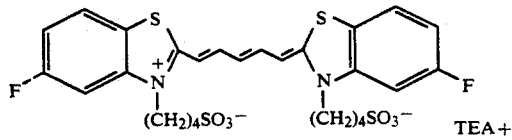

5,5'-Difluoro-3,3'-disulfobutylthiadicarbocyanine Triethylammonium Salt 6.0 g (0.020M) of 5-fluoro-2-methyl-(4'-sulfobutyl)-benzothiazolium betaine, 2.64 g (0.020M) of 1,3,3-trimethoxypropene, and 2.8 ml (0.020M) of triethylamine were combined in 20 ml of acetonitrile/ethanol (9:1) and allowed to stir overnight. The solid that formed was collected, washed with acetonitrile, then resuspended in acetonitrile, refluxed for 10 minutes, then filtered while still hot. The solid left behind was washed with cold acetonitrile, and finally dried in a vacuum desiccator overnight. Analysis by HPLC on a reverse phase C-18 column using 70% methanol/water containing 0.002 molar tert-butylammonium phosphate as an ion pairing reagent gave a purity of 98% (by area percent). The λmax=660 nm (methanol); ε=234,000. Mass spectroscopy by FAB+ gave the expected m/e=642. Yield of dye was 2.56 g (17%).

EXAMPLE 3

Preparation of the compound having the formula

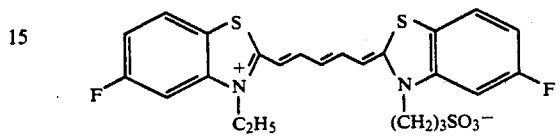

3-Ethyl-5,5,'-difluoro-3'-sulfopropylthiadicarbocyanine.

3-ethyl-5-fluoro-2-methylbenzothiazolium tosylate, 1.84 g (0.005 Moles) and malonaldehyde dianil hydrochloride, 1.29 g (0.005 Moles), were combined in a 250 ml round bottom flask with 80 ml of acetic anhydride and the mixture heated to 85° C. for 20 minutes. 1.45 g (0.005 Moles) of 5-fluoro-2-methyl-3-(3'-sulfopropyl)-benzothiazolium betaine was then added, followed by 0.70 ml (0.005 Moles) of triethylamine. The reaction mixture changed color from brown to magenta then deep blue. Heating at 80° C. and stirring were continued for 2 additional hours, and then the reaction was allowed to cool to room temperature with stirring overnight.

The blue solid was collected by vacuum filtration and washed with methanol. Repeated crystallizations from trifluoroethanol failed to purify the product. The dye was purified by column chromatography on dry silica gel. Approximately 1 g of dye was dissolved in 200 ml of trifluoroethanol at room temperature, poured onto the head of the column and allowed to adsorb onto the silica surface as the solvent was pushed down by air pressure. This is followed by 500ml of methylene chloride to further remove the trifluoroethanol from the adsorbed dye, followed by methylene chloride/methanol (8.5:1.5) to elute the desired product. The fastest running blue band was collected, the fractions combined and solvent removed on a rotovap to give a blue residue which was crystallized twice from hot trifluoroethanol to give 0.270 g of desired product (yield 10%). The λmax=653 nm (trifluoroethanol); ε=255,000.

Analysis by HPLC on a reverse phase C-18 column using 70% methanol/water containing 0.002 molar tert-butylammonium phosphate as an ion pairing reagent gave a purity of 98% (by area). Mass spectroscopy by FAB+ gave the expected m/e=521.

The 3-ethyl-5-fluoro-2-methylbenzothiazolium tosylate employed in the foregoing synthesis was prepared as follows:

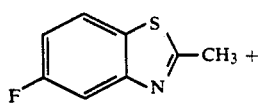

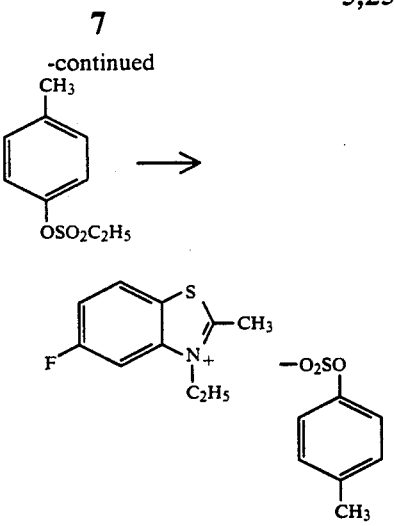

Into a 3-necked 500 ml round bottom flask equipped with a mechanical stirrer and a nitrogen inlet were placed 47.5 g (0.284 Moles) of 5-fluoro-2-methylbenzothiazole, 56.8 g (0.284) ethyl-p-toluenesulfonate, and 50 ml of sulfolane as solvent. The mixture was stirred and heated for 16 hours at 120° C. under a nitrogen atmosphere. After 16 hours the viscous reaction mixture was cooled to 45° C. (stirring continued), followed by the addition of 400 ml of acetone/hexane (1:4). The resulting suspension was stirred in an ice bath cooling for 1 hour. The product was collected by vacuum filtration, washed with an additional 2×200 ml portions of acetone/hexane (1:4), and dried in a vacuum desiccator at 60° C. to constant weight. The pale violet solid isolated (76.2 g, 73% yield) melted at 166°-168° C. Mass spectroscopy gave an expected m/e=196 mass units. Proton NMR was consistent with the assigned structure.

Malonaldehyde Dianil Hydrochloride was prepared as follows:

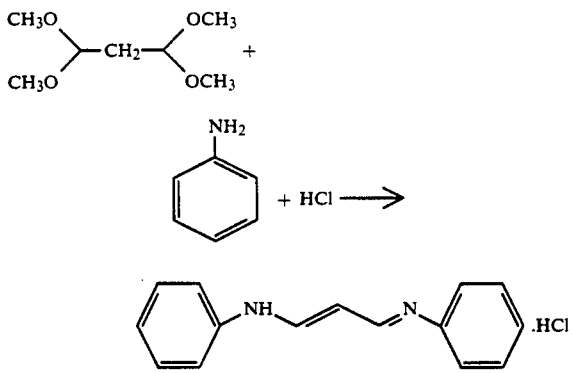

To a 500 ml round bottom 3-necked flask equipped with a mechanical stirrer, pressure equalizing additional funnel, and a reflux condenser was placed 100 ml of absolute ethanol. Malonaldehyde bis-dimethyl acetal, 76.8 g (0.468), was added to the ethanol followed by 87.1 g (0.935 Moles) of aniline. The reaction was heated to reflux for 2 minutes, then allowed to cool to room temperature. Concentrated hydrochloric acid, 1.40 Mole (121 ml), was then added dropwise to the solution. After addition of HCl was complete, ice water was poured into the reaction mixture and the precipitated anil was collected and washed with water and diethyl ether. The solid was dried in a vacuum desiccator to afford 121.1 g (81%) of product. Mass spectroscopy by FAB+ gave the expected m/e=223 mass units. Proton NMR was consistent with the assigned structure.

EXAMPLE 4

A much higher yield of the infrared sensitizing dye prepared in the above Example 3 was obtained by the following procedure: 5-fluoro-2-methyl-3-sulfopropylbenzothiazole was added to a hot (100° C.) solution of 1,3,3-trimethoxypropene in acetic acid. Recrystallization of the brown product from hot methanol gave 5-fluoro-2(4-methoxy-1,3-butadienyl)-3-sulfopropylbenzothiazolium betaine; analytical data, NMR and mass spectroscopy were consistent with the anticipated structure. (The synthesis of this intermediate was similar to the procedure described in British Patent 394,537.) An equimolar amount of this intermediate was combined with 5-fluoro-3-ethyl-2-methylbenzothiazole p-toluene sulfonate salt in acetonitrile with an equimolar amount of triethylamine and refluxed for 10 minutes. The desired sensitizer dye separated on cooling. Recrystallization from hot trifluoroethanol gave the desired product in 78% yield.

The following cyanine dyes, Compounds I–VI, were prepared for use in the photographic comparisons set forth hereinafter.

Compound I

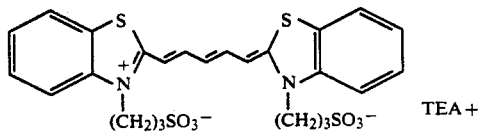

3,3'-Disulfopropylthiadicarbocyanine Triethylammonium Salt

Method A 10.86 (0.040M) 2-methyl-3-(3'-sulfopropyl)benzothiazolium betaine and 6.56 g (0.040M) malonaldehyde tetramethyl acetal were added to 30 ml of acetic anhydride and heated to 80° C. After a few minutes 4.04 g (0.040M) of triethylamine was added and the temperature of the reaction mixture was raised to 110° C. and kept there for two hours. Upon cooling, a blue solid fell out of solution. This solid was collected by vacuum filtration and recrystallized from a mixture of isopropanol/methanol. The metallic blue solid had a λmax=656 nm (in methanol); ε=249,000. FAB+-m/e=578. The yield was 2.93 g (21.5%).

Method B 8.14 g (0.030M) of 2-methyl-3-(3'-sulfopropyl)benzothiazolium betaine and 3.96 g (0.030M) of 1,3,3-trimethoxypropene were added to 50 ml of acetic anhydride. The reaction mixture was heated and stirred while 3.04 g (0.030M) of triethylamine was added. The temperature of the reaction mixture was raised to 100° C., held for two hours, then allowed to cool to room temperature. Acetone was finally added and the reaction mixture was refrigerated overnight. The dark blue solid that came out of solution was collected, washed with acetone, and dried. It was recrystallized from the same solvent combination used in Method A to give a crystalline, blue solid which had an absorption maximum of 653 nm with an epsilon of 260,000 (in 10% trifluoroethanol/90% methanol). The sample was resolved by TLC on silica (methylene chloride/methanol/acetone-

Compound II

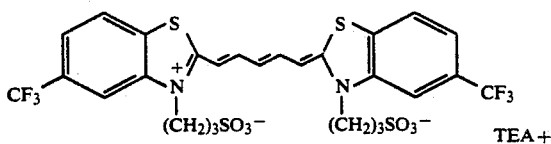

5,5'-Trifluoromethyl-3,3'-disulfopropylthiadicarbocyanine Triethylammonium Salt 6.7 g (0.020M) of 2-methyl-3-(3'-sulfopropyl)-5-trifluoromethylbenzothiazole betaine and 2.64 g (0.020M) 1,3,3-trimethoxypropene were combined in 25 ml of acetonitrile/ethanol (9:1) and stirred. To this mixture 2.8 ml (0.020M) of triethylamine was added. The suspension became a deep cyan solution. After 10 minutes the temperature of the reaction mixture was raised to 80° C. The reaction mixture became more viscous and after an additional 10 minutes had passed, green crystals of solid were evident. Heating was stopped and the reaction mixture allowed to cool to room temperature. The solid was collected, washed with acetonitrile and dried overnight in a vacuum desiccator. The dye had a λmax=652 nm (20% trifluoroethanol/methanol); ε=140,000. FAB+m/e=715. Yield of final product was 1.95 g (15%).

Compound III

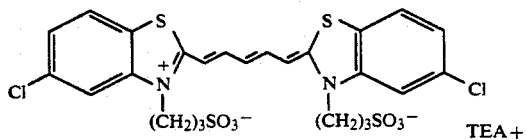

5,5'-Dichloro-3,3'-disulfopropylthiadicarbocyanine Triethylammonium Salt 6.12 g (0.020M) of 5-chloro-2-methyl-3-(3'-sulfopropyl)benzothiazole betaine and 2.64 g (0.020M) of 1,3,3-trimethoxypropene were combined in 50 ml of acetic anhydride and heated for 18 minutes to 100° C. To this reaction mixture 2.77 ml (0.020M) of triethylamine was added. The pale green solution turned a dark blue. Heating was discontinued and the solution allowed to cool. A royal blue solid formed upon cooling. The solid was collected, washed with fresh acetic anhydride, recrystallized from isopropanol/methanol/ trifluoroethanol and dried in a vacuum desiccator overnight. λmax=660 nm (10% trifluoroethanol/ methanol); ε=164,000. FAB+m/e=717.

Compound IV

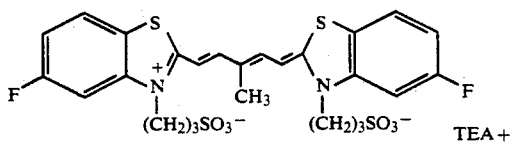

5,5'-Difluoro-10-methyl-3,3'-disulfopropylthiadicarbocyanine Triethylammonium Salt 5.79 g (0.020M) of 5-fluoro-2-methyl-3-(3'-sulfopropyl)benzothiazolium betaine and 2.73 g (0.010M) of 3-anilinomethacrolein anil hydrochloride were combined in 30 ml of acetonitrile/ethanol (9:1). To this mixture 2.77 ml (0.010M) of triethylamine was added and the reaction was heated to 70° C. for 15 minutes, then allowed to cool to room temperature. A dark blue solid came out of solution and was collected by vacuum filtration, washed with acetone, and dried in a vacuum desiccator overnight. λmax=656 nm (10% trifluoroethanol/methanol); ε=260,000. FAB+m/e=63. Yield of dye was 3.2 g (43%).

Compound V

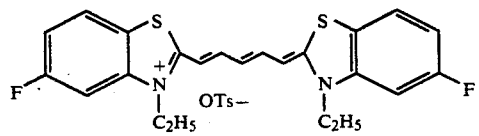

3,3'-diethyl-5,5'-difluorothiadicarbocyanine p-toluene sulfonate

Method A:

1.58 g (0.0043M) of 3-ethyl-5-fluoro-2-methylbenzothiazolium tosylate and 0.557 g (0.0022M) of malonaldehyde dianil hydrochloride were combined in 10 ml of acetonitrile/ethanol (9:1). To this reaction mixture 0.600 ml (0.0043M) of triethylamine was added and the mixture heated briefly to 80° C. then cooled to room temperature. The crystals formed were collected and recrystallized from a mixture of trifluoroethanol/ methanol and dried in a vacuum desiccator overnight. λmax=656 nm (10% trifluoroethanol/methanol); ε=252,500. FAB+m/e=428.

Method B:

5.0 g (0.0136M) of 3-ethyl-5-fluoro-2-methylbenzothiazolium tosylate, 0.9 g (0.007M) of 1,3,3-trimethoxypropene, and 1.9 ml (0.0136M) of triethylamine were all combined in 22 ml of acetonitrile/ethanol (9:1) and allowed to stir overnight at room temperature. The solid that formed was collected, washed with fresh acetonitrile and dried in a vacuum desiccator overnight. TLC on silica using 15% methanol/methylene chloride showed a single spot. Mass spectroscopy gave the expected molecular ion at 428 mass units. The dye had an absorption maximum of 656 nm and an epsilon of 234,000 (in methanol). Yield was 1.2 g (15%).

Compound VI

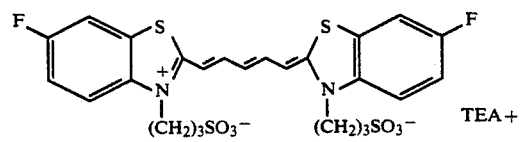

6,6'-Difluoro-3,3'-disulfopropylthiadicarbocyanine Triethylammonium Salt 2.0 g (0.007M) 6-fluoro-2-methyl-(3'-sulfopropyl)benzothiazolium betaine, 0.914 g (0.007M) 1,3,3-trimethoxypropene, and 0.97 ml (0.007M) of triethylamine were combined in 25 ml of acetonitrile/ethanol (9:1). The reaction mixture was heated for a few minutes to 80° C., then allowed to cool to and stir at room temperature for two hours. The solid which crystallized in the magenta solution was collected, washed with acetonitrile, recrystallized from trifluoroethanol/ methanol, and dried in a vacuum desiccator overnight. HPLC of a sample on a C-18 column using an ion pairing reagent in the mobile phase indicated a purity of 98% by area. The $\lambda max = 653$ nm (methanol); $\epsilon = 222,000$. FAB+-m/e=615. Yield of dye was 0.160 g (3.2%).

FAB as used above refers to mass spectroscopy using Fast Atom Bombardment Techniques, and all the compounds prepared above gave the correct molecular ion. HPLC refers to High Pressure Liquid Chromatography and TLC refers to Thin Layer Chromatography. HPLC was used to ascertain purity of the dyes as well as monitor progress of some of the reactions. Chromatography was performed on a C-18 reverse phase column, using methanol/water as the eluent. In analyzing the anionic dyes (Examples 1 and 2 and Compounds I-IV and VI), an ion pairing reagent (tert-butylammonium phosphate-0.002 Molar) was used to better retain the dye on the column as well as reduce tailing. In the case of zwitterionic dye (Example 3), the ion pairing reagent was unnecessary. In the case of the cationic dye (Compound V), HPLC was not used (the dye was adsorbed too strongly to be eluted at all), and in its place TLC on silica 15% methanol/methylene chloride was used.

The sensitizing dyes of this invention as represented by general formula (I) may be used alone or in combination with other spectral sensitizing dyes and can be applied to the sensitization of silver halide emulsions to be used for various color or black-and-white photographic processes for forming an image in dye or in silver. They may be incorporated into a photographic silver halide emulsion in a conventional manner. They may be dispersed directly, or they may be dissolved in a suitable solvent such as water, methanol, ethanol, acetone, trifluoroethanol, methyl cellusolve pyridine or a mixture thereof and added as a solution for uniformly distributing the dye throughout the emulsion. The amount of dye employed usually is between about 0.5 and 5.0 mgs of dye per gram of silver. The optimum amount for a given emulsion for use in a given photographic system may be readily determined by routine testing.

The silver halide emulsion employed can be produced using techniques well-known in the art and can contain as the silver halide component, silver chloride, silver bromide, silver iodide, silver chlorobromide, silver chloroiodide, silver bromoiodide or silver chlorobromoiodide. Such emulsions can be coarse, medium or fine grain or a mixture thereof, and the silver halide grains may have any configuration, uniform or irregular.

Usually, gelatin is employed as the binder for the emulsion. However, the gelatin may be used in admixture with or replaced by other materials, gelatin derivatives, cellulose derivatives, or by synthetic polymeric materials such as, polyvinylalcohol, polyvinylpyrrolidone, and the like.

In addition to the spectral sensitizing dyes, the silver halide emulsion can be chemically sensitized using chemical sensitizers (e.g. sulfur, selenium, tellurium compounds; gold, platinum, palladium compounds; reducing agents such as tin chloride, phenylhydrazine, reductone, etc.) and may contain other additives as discussed in Research Disclosure 17643, December 1978. Illustrative of such additives are antifoggants and stabilizers (e.g. noble metal salts, mercury salts, oximes, sulfocatechols, mercapto compounds, thiazolium compounds, urazoles, triazoles, azaindenes, etc.); hardening agents (e.g. aldehyde compounds, ketone compounds, active halogen compounds, active olefin compounds, carboxylic and carbonic acid derivatives, dioxane derivatives, aziridines, isocyanates, epoxy compounds, carbodiimides, etc. and inorganic compounds such as chrome alum and zirconium sulfate); speed increasing compounds (e.g. polyalkylene glycols, thioethers, cationic surface active agents, etc.); coating aids (e.g. natural surfactants such as saponin, nonionic surfactants such as alkylene oxide derivatives, cationic surfactants such as quaternary ammonium salts, anionic surfactants having an acidic group such as a carboxylic, sulfonic or phosphoric acid group and amphoteric surfactants such as amino acids and aminosulfonic acids); and plasticizers and lubricants (e.g. polyalcohols, fatty acids and esters, silicone resins and the like).

Photographic elements including emulsions sensitized in accordance with the present invention also may contain other agents such as optical brightening agents, matting agents, anti-static agents, and light-absorbing materials, e.g., antihalation and color correction filter dyes.

The photographic elements also can contain developing agents such as, hydroquinones, catechols, aminophenols, 3-pyrazolidones, substituted hydroxylamines, reductones and phenylenediamines or combinations thereof. The developing agents can be contained in the silver halide emulsion and/or in another suitable location. Depending upon the particular photographic system, the developing agent may be used as an auxiliary developer or as a color-forming developer where a color-forming coupler also may be included in the photographic element.

Emulsions spectrally sensitized in accordance with the present invention can be coated on a wide variety of supports, for example, glass, paper, metal, cellulose acetate, cellulose nitrate, polyvinylacetal, polyethylene, polyethylene terephthalate, polyamide, polystyrene, polycarbonate, etc. The emulsion can be coated on the support by various coating procedures including dip coating, air knife coating, curtain coating, extrusion coating, etc.

Exposure for obtaining a photographic image may be conducted in a conventional manner. That is, any of various known light sources emitting light rays including infrared rays may be employed such as natural sunlight, a tungsten lamp, a cathode ray tube, light-emitting diodes and laser light (e.g., from a gas laser, YAG laser, dye laser, semiconductor laser, etc.). Also, exposure may be effected by using light emitted from a fluorescent body excited with electron beams, X-rays, gamma-rays, $\alpha$-rays or the like.

While useful in a variety of photographic processes, emulsions spectrally sensitized in accordance with this invention are particularly useful in diffusion transfer photographic systems, for providing silver or color images. These photographic processes are now well known and need not be described in detail here. Color image formation in diffusion transfer processes rely upon a differential in mobility or solubility of an image dye-providing material obtained as a function of imagewise development of an exposed silver halide emulsion so as to provide an imagewise distribution of such material which is more diffusible and which, therefore, may be selectively transferred to an image-receiving layer comprising a dyeable stratum to impart thereto the desired color transfer image. The differential in mobility or solubility may be obtained, for example, by a chemical action such as a redox reaction, a silver-ion assisted cleavage reaction or a coupling reaction.

Image dye-providing materials which may be employed generally may be characterized as either (1) initially soluble or diffusible in the processing composition but are selectively rendered non-diffusible in an imagewise pattern as a function of development; or (2) initially soluble or non-diffusible in the processing composition but which are selectively rendered diffusible or provide a diffusible product in an imagewise pattern as a function of development. The image dye-providing materials may be complete dyes or dye intermediates.

Examples of initially soluble or diffusible materials and their application in color diffusion transfer processes are disclosed, for example, in U.S. Pat. Nos. 2,774,668; 2,968,554; 2,983,606; 3,087,817; 3,185,567; 3,230,082; 3,345,163; and 3,443,943. Examples of initially non-diffusible materials and their use in color diffusion transfer systems are disclosed in U.S. Pat. Nos. 3,185,567; 3,443,939; 3,443,940; 3,227,550; 3,227,551; 3,227,552; 3,227,554; 3,243,294; 3,445,228; 3,719,488; 3,719,489; and 4,076,529. The use of a hybrid system using an initially soluble or diffusible material, i.e., a dye developer for one or more colors in combination with an initially non-diffusible material, i.e., a thiazolidine compound that undergoes silver ion-assisted cleavage to release a diffusible dye for the other color(s) is disclosed in U.S. Pat. No. 4,740,448.

As is now well known, film units employed in diffusion transfer processes for providing multicolor images comprise two or more selectively sensitive silver halide emulsion layers each having associated therewith the appropriate image dye-providing material. For full color photography, these materials are preferably selected for their ability to provide colors that are useful in carrying out subtractive color photography, that is, cyan, magenta and yellow. Such film units also contain an image-receiving layer, i.e., the dyeable stratum; preferably, an acid-reacting reagent, e.g., a polymeric acid layer; and optionally, interlayers or spacer layers between the respective silver halide emulsion layers and associated image dye-providing materials, an interlayer or spacer layer between the polymeric acid layer and the dyeable stratum to control or "time" the pH reduction so that it is not premature and thereby interfere with the development process, overcoat layers and antihalation, subcoat and other layers.

In such film units, the photosensitive component comprising the silver halide emulsion layers, sometimes referred to as the "negative component" and the image-receiving component comprising at least the dyeable stratum, referred to as the "positive component" initially may be carried on separate supports (in which event they may be referred to as a photosensitive element and as a second sheet-like element) which are brought together during processing and thereafter retained together as an integral negative-positive reflection print, or they may initially comprise a unitary structure wherein the negative and positive components are retained together prior to, during and after image formation. Rather than retaining the negative and positive components as an integral structure, the film unit may be designed so that the image-receiving or positive element is separated from the remaining layers of the film unit subsequent to processing in order to view the image. In certain embodiments, also known in the art, the image-receiving layer is carried on the same support as the photosensitive element, and the second, sheet-like element may contain the timing polymeric acid layers; such an element is sometimes referred to in the art as a cover sheet.

The liquid processing composition applied subsequent to imagewise exposure comprises at least an aqueous solution of an alkaline material, for example, sodium hydroxide or potassium hydroxide and preferably possesses a pH in excess of 12 and preferably includes a viscosity-increasing compound constituting a film-forming material, such as, hydroxyethyl cellulose, sodium carboxymethyl cellulose or polydiacetone acrylamide oxime. The processing composition is contained in a rupturable container or pod so positioned as to distribute the processing composition between the superposed sheets of the product or film unit.

Depending upon the particular image-dye providing materials and the particular diffusion transfer system, a developing agent such as those enumerated above; a silver halide solvent such as thiosulfates, uracils and thioether-substituted uracils; a light-absorbing optical filter agent such as the pH-sensitive phthalein dyes described in U.S. Pat. No. 3,647,437; and a light-reflecting material such as titanium dioxide also may be included in the processing composition and/or in an appropriate layer of the film unit. In addition, the processing composition may contain preservatives, restrainers, accelerators and other reagents as may be desired.

Whether the photosensitive element is intended for use in diffusion transfer or other photographic color imaging systems, it will be appreciated that an infrared sensitized silver halide emulsion of the present invention can be used in combination with silver halide emulsion(s) selectively sensitized to wavelengths in the visible and/or infrared region of the electromagnetic spectrum. For example, in the production of full color images (three-color images), the other two emulsions used in combination with an infrared sensitized silver halide emulsion of the present invention can be sensitive, respectively to green and red portions of the visible region. Alternatively, one or both of the other two emulsions can be sensitized to other selected wavelengths in the infrared region (750 nm -1500 nm) as described in U.S. Pat. No. 4,619,892.

In a preferred embodiment, the photosensitive element comprises a support carrying, in sequence, a layer of a cyan image dye-providing material, an infrared sensitized silver halide emulsion, a layer of a magenta image dye-providing material, a red-sensitive silver halide emulsion, a layer of a yellow image dye-providing material, and a layer of a blue sensitive silver halide emulsion. In a particularly preferred embodiment, the image dye-providing materials are dye developers, and exposure is effected using light-emitting diodes (LED) emitting light of the appropriate infrared, red and green wavelengths. Such a combination of light-emitting diodes avoids the use of less efficient blue light-emitting diodes. The usual red, green and blue records are used to provide the image information to activate the infrared, red and green LEDS in known manner, thus providing a normal full color image.

The following comparisons are given to further illustrate the present invention.

The dyes of Examples 1 to 3 and the dyes designated Compounds I to VI were dissolved in trifluoroethanol and the dye solutions were added with stirring to a gelatino silver iodobromide emulsion (1% iodide) containing 4'-methylphenylhydroquinone (MPHQ). The dyes were added to the emulsion at a level of 0.5 mg dye/g Ag. The resulting emulsions were coated on a transparent polyethylene terephthalate film base at a coverage of 1200-1300 mg Ag/m² and 3000 mg gelatin/m², and overcoated with a 300 mg/m² layer of gelatin as a protective topcoat. After air drying at 20°-25° C., the sample negatives thus prepared together with control negatives without sensitizing dyes were stored at room temperature and humidity for several days and then exposed and processed.

After the storage times shown in the following Table, several sets of sample negatives were exposed and processed as follows:

(1) One set of sample negatives including a control (unsensitized) was exposed at a wavelength of 420 nm at 2 mcs (meter candle seconds) and processed using a Polaroid Type 52 image receiving sheet and processing composition by superposing the negatives with the receiving sheets and spreading a layer of the processing composition 0.0028 inch thick between the superposed elements. After an imbibition time of one minute in the dark, the receiving sheets were separated from the negatives and the maximum and minimum reflection densities (Dmax/Dmin) were measured for the transfer image. The speed (SPD-L) relative to the control was measured at the 0.75 intercept was determined from an H&D curve generated at this exposure.

(2) A second set of sample negatives including a control was exposed in a wedge spectrograph over the wavelength range of 400 nm and 900 nm and processed as in (1) above to obtain the sensitivity range (RANGE) and the peak sensitivity (PEAK). The spectrograph was fitted with a target calibrated in nanometers (nm) that was transferred as a grid to the receiving sheet for visual determination of the RANGE and PEAK.

(3) A third set of sample negatives including a control was exposed to interference filter targets at 10 nm intervals over a wavelength range of 400 nm to 900 nm and processed as in (1) above. The speed (SPD-H) was determined from an H&D curve generated at the peak sensitivity and was measured at the 0.75 intercept.

TABLE

| Dye Compound | Storage Time (d) | Intrinsic Dmax/Dmin | SPD-L (420) | Sensitivity Range | Peak | SPD-H (Peak) |
|---|---|---|---|---|---|---|
| Control | 96 | 1.51 0.11 | 1.45 | 400-550 | — | — |
| Ex. 1 | 28 | 1.47 0.09 | 1.22 | 520-850 | 830 | 1.00 |
| Ex. 2 | 42 | 1.51 0.11 | 1.20 | 555-890 | 830 | 1.57 |
| Ex. 3 | 42 | 1.53 0.11 | 1.22 | 520-860 | 830 | 1.12 |
| Cpd. I | 15 | 1.37 0.09 | 1.22 | 550-850 | 830 | 0.51 |
| Cpd. II | 62 | 1.31 0.09 | 1.28 | none | 0 | 0.00 |
| Cpd. III | 15 | 1.54 0.09 | 1.39 | 550-820 | 790 | 0.00 |
| Cpd. IV | 62 | 1.59 0.09 | 1.25 | 650-730 | 710 | 0.09 |
| Cpd. V | 62 | 1.51 0.10 | 1.43 | 650-730 | 700 | 0.00 |
| Cpd. VI | 42 | 1.57 0.10 | 1.25 | 550-750 | 710 | 0.00 |

As can be seen from the results tabulated above, the emulsions containing the anionic and zwitterionic 5-fluorobenzothiazole dye compounds of the present invention possess peak spectral absorption in the infrared region at a wavelength well above 800 nm and exhibit excellent sensitivity at the peak wavelengths while retaining good sensitivity in the intrinsic region. In comparison, the emulsions containing the 5-fluorobenzothiazole compound having a meso substituent (Cpd. IV), the cationic 5-fluorobenzothiazole compound (Cpd. V) and the benzothiazole compounds possessing certain 5-/6-substituents (Cpds. II, III and VI) exhibit little or no sensitivity in the infrared. Though the emulsion containing the unsubstituted benzothiazole compound (Cpd. I) possesses an absorption peak above 800 nm, it gives much lower speed at the longer wavelengths and becomes foggy in the intrinsic region losing Dmax.

The increased speed and longer wavelength sensitization demonstrated in the above comparative results are believed to be due, at least in part, to the fact that the structure of the novel dyes facilitates J-banding. A shift of about 120 nm or more in λmax to longer wavelengths is obtained by J-banding as compared with solution λmax. Heptamethine cyanine dyes proposed for infrared sensitization at wavelengths above 800 nm exhibit low photographic speed and do not J-band.

Since certain changes may be made in the above subject matter without departing from the scope of the invention herein involved, it is intended that all matter contained in the above description shall be interpreted as illustrative and not in a limiting sense.

We claim:

1. A light-sensitive photographic silver halide emulsion spectrally sensitized to infrared radiation above about 800 nm with a sensitizing dye having the formula

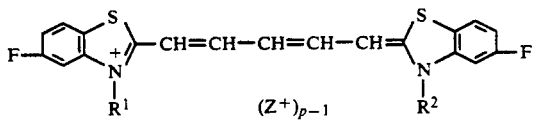

wherein $R^1$ is alkyl having 2 to 4 carbon atoms or $-(CH_2)_mR'$ wherein $R'$ is carboxy or sulfo and m is 2, 3 or 4; $R^2$ is $-(CH_2)_nR''$ wherein $R''$ is carboxy or sulfo and n is 2, 3 or 4; $Z^+$ is a counter ion; and p is 1 or 2 provided p is 1 when $R^1$ is alkyl and p is 2 when $R^1$ is $-(CH_2)_mR'$.

2. A photosensitive element comprising a support carrying a silver halide emulsion, said silver halide emulsion being spectrally sensitized to infrared radiation above about 800 nm with a sensitizing dye having the formula

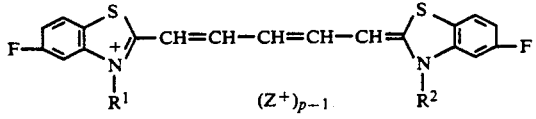

wherein $R^1$ is alkyl having 2 to 4 carbon atoms or $-(CH_2)_mR'$ wherein $R'$ is carboxy or sulfo and m is 2, 3 or 4; $R^2$ is $-(CH_2)_nR''$ wherein $R''$ is carboxy or sulfo and n 2, 3 or 4; $Z^+$ is a counter ion; and p is 1 or 2 provided p is 1 when $R^1$ is alkyl and p is 2 when $R^1$ is $-(CH_2)_mR'$.

3. A photosensitive element as defined in claim 2 wherein $R^1$ is alkyl and p is 1.

4. A photosensitive element as defined in claim 2 wherein $R''$ is sulfo.

5. A photosensitive element as defined in claim 2 wherein $R^1$ is ethyl and n is 3.

6. A photosensitive element as defined in claim 2 wherein $R^1$ is —$(CH_2)_mR'$, $R'$ is carboxy or sulfo, m is 2, 3 or 4 and p is 2.

7. A photosensitive element as defined in claim 2 wherein $R'$ and $R''$ are sulfo.

8. A photosensitive element as defined in claim 2 wherein $R^1$ is —$(CH_2)_mR'$ and $R^2$ is —$(CH_2)_nR''$ m and n are equal, and $R'$ and $R''$ are the same; m and n are 2, 3 or 4; and $R'$ and $R''$ are carboxy or sulfo; p is 2.

9. photosensitive element as defined in claim 8 wherein $R'$ and $R''$ are sulfo, and m and n are 3.

10. A photosensitive element as defined in claim 9 wherein $Z^+$ is triethylammonium.

11. A photosensitive element as defined in claim 2 including a layer containing an image dye-providing material positioned between said support and said silver halide emulsion.

12. A photographic product comprising a photosensitive element as defined in claim 2; a second, sheet-like element in superposed or superposable position with respect to said silver halide emulsion; a rupturable container releasably holding a processing composition and positioned to release said composition for distribution between said elements; said photosensitive element or said second, sheet-like element containing an image-receiving layer for receiving by diffusion transfer an imagewise distribution of diffusible image-forming material formed in said photosensitive element following distribution of said processing composition.

13. A photographic product as defined in claim 12 wherein said diffusible image-forming material forms a transfer image in silver.

14. A photographic product as defined in claim 12 wherein said diffusible image-forming material forms a transfer image in dye.

15. A photographic product as defined in claim 12 wherein said photosensitive element comprises, in sequence on said support, a layer of a cyan image dye-providing material, a silver halide emulsion spectrally sensitized to infrared radiation with said sensitizing dye, a layer of a magenta image dye-providing material, a layer of a red-sensitive silver halide emulsion, a layer of a yellow image dye-providing material, and a layer of a blue sensitive silver halide emulsion.

16. A sensitizing dye of the formula

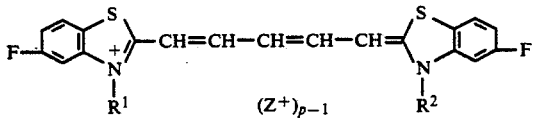

wherein $R^1$ is alkyl having 2 to 4 carbon atoms or —$(CH_2)_mR'$ wherein $R'$ is carboxy or sulfo and m is 2, 3 or 4; $R^2$ is —$(CH_2)_nR''$ wherein $R''$ is carboxy or sulfo and n is 2, 3 or 4; $Z^+$ is a counter ion; and p is 1 or 2 provided p is 1 when $R^1$ is alkyl and p is 2 when $R^1$ is —$(CH_2)_mR'$.

17. A sensitizing dye as defined in claim 16 wherein $R^1$ is alkyl and p is 1.

18. A sensitizing dye as defined in claim 16 wherein $R''$ is sulfo.

19. A sensitizing dye as defined in claim 16 wherein $R^1$ is ethyl and n is 3.

20. A sensitizing dye as defined in claim 16 wherein $R^1$ is —$(CH_2)_mR'$, $R'$ is carboxy or sulfo, m is 2, 3 or 4 and p is 2.

21. A sensitizing dye as defined in claim 16 wherein $R'$ and $R''$ are sulfo.

22. A sensitizing dye as defined in claim 16 wherein $R^1$ is —$(CH_2)_mR'$ and $R_4$ is —$(CH_2)_nR''$ provided m and n are equal, and $R'$ and $R''$ are the same; m and n are 2, 3 or 4; and $R'$ and $R''$ are carboxy or sulfo; p is 2.

23. A sensitizing dye as defined in claim 22 wherein $R'$ and $R''$ are sulfo, and; m and n are 3.

24. A sensitizing dye as defined in claim 23 wherein $Z^{30}$ is triethylammonium.

* * * * *